United States Patent
Zerb et al.

[15] 3,660,990
[45] May 9, 1972

[54] VIBRATION DAMPER

[72] Inventors: Donald L. Zerb, 4323 1117th Street; William M. Varty, 11634 133rd Street, both of Edmonton, Alberta, Canada

[22] Filed: June 15, 1970

[21] Appl. No.: 46,324

[30] Foreign Application Priority Data

Feb. 27, 1970 Canada..................................76,040

[52] U.S. Cl..................................................64/23, 175/321
[51] Int. Cl...................................E21b 17/04, E21c 15/00
[58] Field of Search........................175/321; 64/23; 285/301

[56] References Cited

UNITED STATES PATENTS 3,382,936  5/1968  Galle......................................175/321
3,301,009  1/1967  Coulter...................................175/321 X
3,383,126  5/1968  Salvatori et al.......................175/321 X
2,756,022  7/1956  Sturgeon.....................................64/33
3,345,832  10/1967  Bottoms................................175/321 X
3,406,537  10/1968  Falkner........................................64/23

Primary Examiner—David H. Brown
Attorney—Rogers, Bereskin & Parr

[57] ABSTRACT

An improved vibration damper for drill bits of the type used in drilling into the earth for oil and gas. The damper includes a rigid metallic sleeve slidably housed in splines formed in an outer casing assembly. The sleeve is free to move longitudinally in the casing assembly and torque is transmitted by the splines. A rubber bush is housed in the outer casing such than when the drill bit receives a longitudinal shock the sleeve moves into the casing assembly and the rubber bush is deformed to absorb the shock.

2 Claims, 3 Drawing Figures

INVENTORS.
DONALD L. ZERB
WILLIAM M. VARTY

BY
Rogers, Bereskin, & Parr 3,660,990

VIBRATION DAMPER

This invention relates to a vibration damper primarily for use with a drill of the type used in drilling for oil and gas.

In drilling the earth for oil and gas, drill bits are subject to strong vibrations which are transmitted upwardly from the drill bit to the drill string and hence to the drill rig at the surface. These vibrations must be reduced to a safe level in order to permit the drilling to be carried out in an efficient manner. This is accomplished by means of vibration dampers which are connected between the drill string and the drill bit. A typical conventional damper has a heavy annular rubber bush which is positioned between and bonded to inner and outer coaxial, cylindrical members such that the outer member transmits torsional forces through the bush to the inner member, which is connected to the drill bit. The torsional forces create shear stresses in the bush, and if the bush fails, the damper must be repaired by bonding a new bush to the inner and outer members. This repair is costly and requires specialized equipment. Furthermore, this type of damper is relatively inefficient in damping longitudinal vibrations.

The damper of the present invention is particularly adapted to damp out longitudinal vibrations. It has been found that the present damper allows faster drill speeds to be used in hard and fractured rock, due to the relatively smooth running of the drill bit when the present damper is used.

According to a preferred embodiment of the invention, an improved damper comprises a rigid metallic sleeve slidably housed in splines formed in an outer casing assembly. The splines allow comparatively free longitudinal movement of the sleeve relative to the outer casing and they transmit torsional forces from the outer casing to the sleeve. A rubber bush is housed in the outer casing in contact with an end of the sleeve so that when the drill receives a longitudinal shock, the sleeve slides longitudinally into the outer casing and the rubber bush absorbs the shock.

The invention will be better understood with reference to the drawings, wherein.

Figure 1:
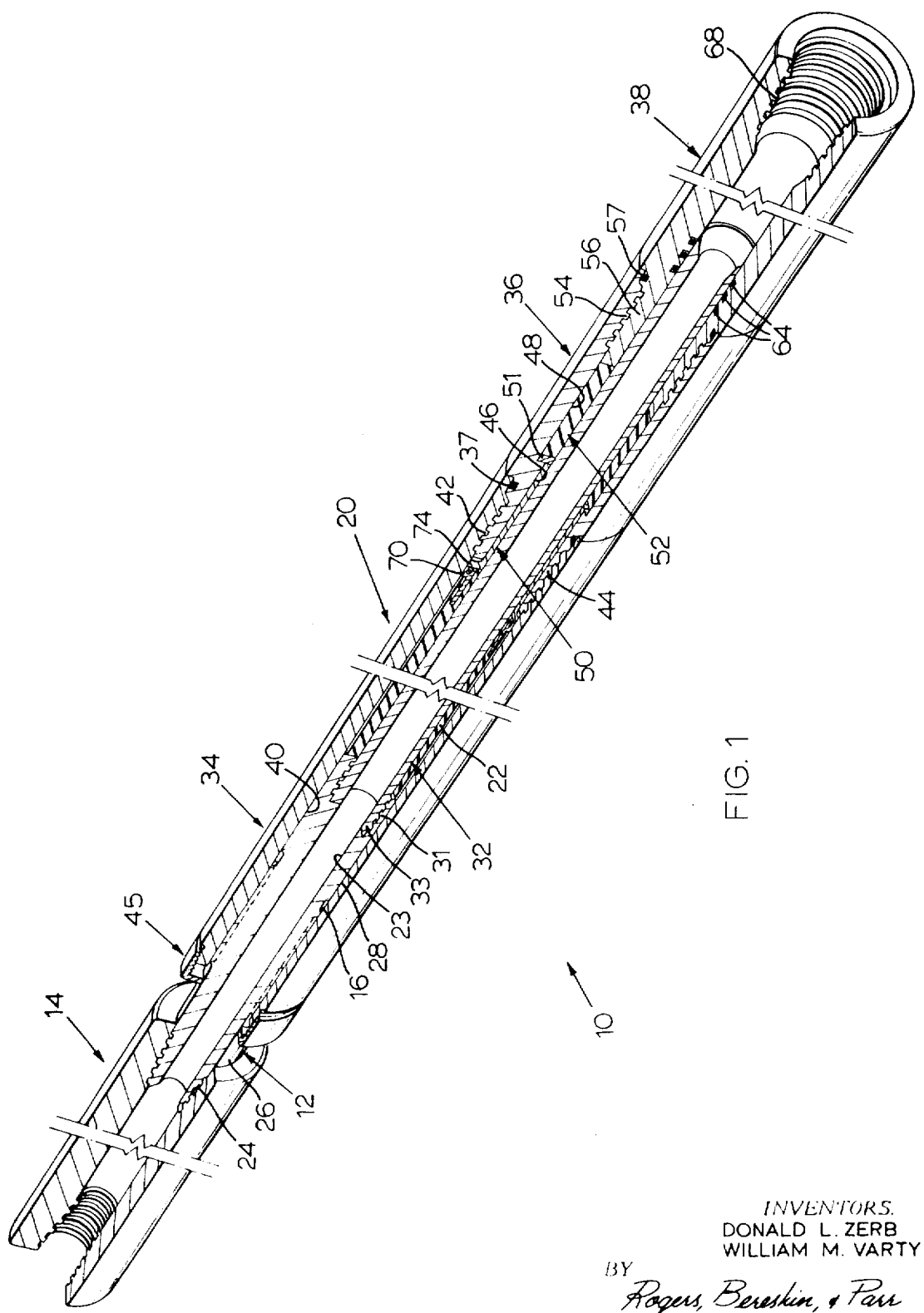
FIG. 1 is a partially sectioned perspective view of a damper according to the invention.
Figure 2:
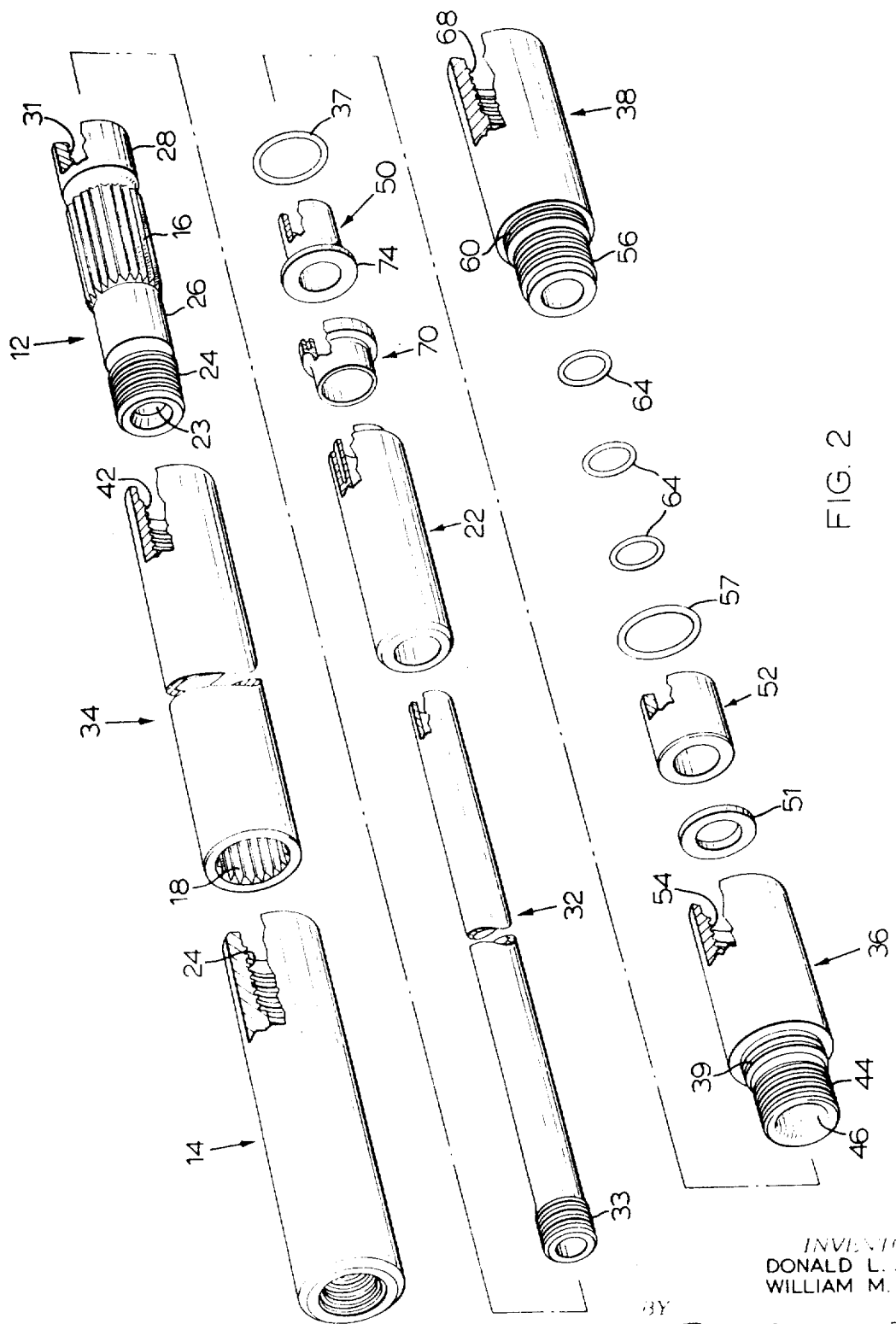
FIG. 2 is an exploded perspective view of the damper.

Reference is first made to FIGS. 1 and 2 with particular reference to FIG. 1. A damper 10 has a lower sleeve 12 which is attached by an adapter 14 to a drill bit (not shown). As used herein, the words upper and lower refer to the position of the damper 10 when it is in place in a drill hole, with its lower end connected to the drill string or pipe. The outer surface of the lower sleeve 12 includes external splines 16 intermediate its length slidably engaged in internal splines 18 (FIG. 2) formed in the lower end of an outer casing assembly 20 so that the lower sleeve 12 and the casing assembly 20 are restrained by the splines to rotate together. The upper end of the sleeve 12 is in contact with the lower end of a tubular rubber bush 22 which is also positioned inside the casing assembly 20, and as will be described in more detail below. When the drill bit suffers a longitudinal shock, the shock is transmitted axially by the adapter 14 to the lower sleeve 12 which then moves longitudinally upwards in the casing assembly 20 and compresses the rubber bush 22. The rubber bush 22 absorbs a substantial portion of the energy of the longitudinal shock and thus limits the shock transmitted to the drill string.

The lower sleeve 12 is tubular and includes a generally cylindrical inner surface 23 and a tapered external thread 24 at its lower end for connection with the adapter 14. The thread 24 terminates at its upper end in a smooth intermediate cylindrical portion 26 which lies between the thread 24 and the splines 16 and has a diameter substantially equal to the root diameter of the splines 16. At its upper end, the sleeve 12 includes a smooth cylindrical portion 28 which has a diameter substantially equal to the outside diameter of the splines 16, and a threaded socket 31 for receiving an externally threaded lower end 33 (FIG 2) of a tubular upper sleeve 32. The sleeves 12 and 32 form a continuous passage for drilling mud which is pumped down the drill string to aid the bit in cutting.

The outer casing assembly 20 is composed of three tubular elements: a lower member 34; and intermediate member 36; and an upper member 38. The members 34, 36 and 38 have similar outer surfaces so that when they are connected together they present a continuous cylindrical outer appearance. The internal splines 18 (FIG. 2) in the lower member 34 terminate in a cylindrical bore 40 (FIG. 1) which slidably receives the upper portion 28 of the lower sleeve 12. At the upper end of the lower member 34, an internal thread 42 receives an externally threaded extension 44 on the intermediate member 36, and traps an O-ring 37 in an external groove 39 (FIG. 2) in the extension 44 to prevent the passage of drilling mud. A protective cap 45 is threadably connected to the lower end of the member 34. If required the cap 45 can include a grease packing for lubricating the splines 16 and 18.

The intermediate member 36 has a longitudinal axial opening 46 at its lower end (i.e. at the extension 44) which is slightly larger in diameter than the outer diameter of the upper sleeve 32, and at its upper end the member 36 has a larger axial cylindrical opening 48 (FIG. 1). The opening 46 slidably journals a tubular member 50 and the upper opening 48 contains a rubber sealing bush 52 which is in close sliding contact with the upper sleeve 32. The function of the bush 52 will be described below.

The upper end of the tubular member 36 includes an internal thread 54 to receive a threaded cylindrical projection 56 on the upper member 38. The projection 56 houses an O-ring 57 in a groove 60 (FIG. 2) for preventing drilling mud entering past the thread 54 and the upper end of the member 36 has an internal thread 68 for attaching the damper 10 to a drill string. The damper is further sealed by three O-rings 64 in internal grooves in the upper member 36. The sealing bush 52 also acts as a secondary seal behind the O-rings 57 and 64 and it also absorbs some of the longitudinal shocks transmitted by the drill bit, as will now be described.

The upper end of the tubular rubber bush 22 has a metallic ring 70 bonded into it to facilitate lifting the bush for assembling and servicing the damper. The upper end of the ring 70 also provides a bearing surface which is in contact with the lower surface of a radial flange 74 on the tubular member 50. A gap is provided between the upper face of the flange 74 and the lower end of the intermediate member 36 to allow a limited movement of the member 50 relative to the assembly 20. Since the upper end of the tubular member 50 is in contact with a washer 51 which covers the end of the sealing bush 52, a proportion of a longitudinal shock at the drill bit is transmitted to the bush 52 before the flange 74 engages the member 36 thereby preventing further compression of the bush 52. As soon as the shock is over, the sealing bush 52 exerts a restoring force to bring the tubular member 50 back to its original position relative to the assembly 20.

While the bush 52 aids in damping the longitudinal shocks, its main purpose is to ensure that mud does not enter into the damper and pass down to the rubber bush 22. Should mud or fluid envelop the bush 22, it would fill the space available for distorting the bush, and since the liquid and the bush are substantially incompressible, they would form an almost solid resistance to shocks thereby reducing the effectiveness of the damper.

Reference is now made to FIG. 2 to describe the method of assembling the damper. The O-rings 37, 57 and 64 are first placed in their respective grooves and then the upper end of the lower member 34 is pushed over the lower end of the lower sleeve 12 until the splines 16 and 18 are fully engaged, and the protective cap 45 is screwed onto the lower end of the member 34. Next the adapter 14 is screwed on to the lower sleeve 12 and with the assembly vertical, the rubber bush 22 is slid into place with its lower end in contact with the upper end of the sleeve 12. Next the upper sleeve 32 is screwed into the lower sleeve 12 and the tubular member 50 is placed around the sleeve 32 with the flange 74 in contact with the ring 70 and then the intermediate member 36 is screwed into the lower member 34. Following this the washer 51 and sealing bush 52 are positioned in the intermediate member and finally the upper member 38 is screwed into the intermediate member. The damper is then ready to be attached to a drill bit and to the lower end of the drill string.

Although the damper has been described with the adapter 14 attached to the drill bit, the damper could be inverted and the upper member 38 could be attached to the drill bit. However, it is preferable to have a minimum of undamped weight to improve drill life and for this reason the lighter end (i.e. the adapter 14) is preferably attached to the drill bit.

Figure 3:
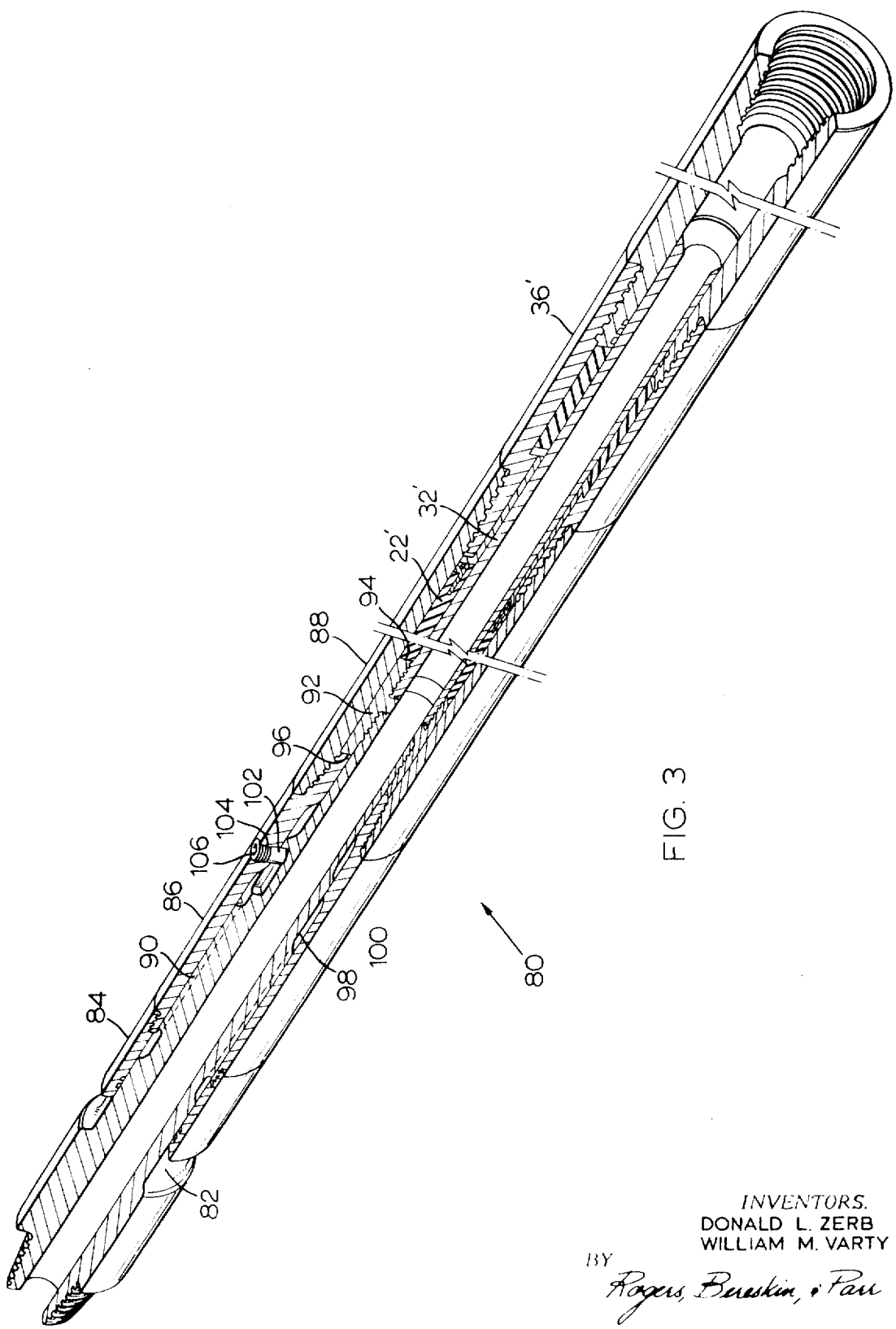
FIG. 3 is a view similar to FIG. 1 showing an alternative embodiment of the invention.

Reference is now made to FIG. 3 which shows a damper 80 which includes many of the parts described with reference to FIGS. 1 and 2. These parts are indicated by primed numerals and it will be seen from a comparison of FIGS. 1 and 3 that the damper 80 differs from the damper 10 in the arrangement of a lower sleeve 82 and members 84, 86, 88 which together take the place of lower member 34 illustrated in FIG. 1. The members 84, 86 and 88 are threadably connected and form a continuation of intermediate member 36'. The lower sleeve 82 has external splines 90 which engage in internal splines in the member 86 for transmitting torque from the drilled string to the bit. At its upper end, the lower sleeve 82 is connected through an adapter 92 to an upper sleeve 32'. The upper end surface 94 of the adapter 92 engages the lower end of a tubular rubber bush 22' and the lower end surface 96 of the adapter 92 engages an upper end of the member 86 to prevent separation of the parts.

The splines 90 on the inner sleeve 82 terminate at their upper end in an intermediate cylindrical portion 98 in which is machined a pair of diametrically opposed slots 100 (one of which is shown). Each slot 100 receives a locating pin 102 in a cylindrical recess 104 in the member 86 and the locating pin 102 is retained in position by a locking screw 106 which is threaded into the member 86. The longitudinal extent of the slot 100 determines the longitudinal distance through which the lower sleeve 82 is free to move in compressing the rubber bush 22' to thereby limit the stress on the bush. Also, if through fatigue or other reasons the lower sleeve 82 should break at a point of minimum cross-section (i.e. adjacently adapter 92), then the drill together with the broken part of the lower sleeve 82 will not fall into the drill hole but will be retained by the pins 102.

To assemble the damper 80, the lower sleeve 82 is positioned and after the necessary oil seals have been placed in the parts, the members 80 and 86 are attached together and then slipped over the upper end of the lower sleeve 82. Once in place, the member 86 receives the pins 104 which are located in the slots 100 and the locking screws 106 are put in place. Next the adapter 92 is attached to the lower sleeve 82, and the upper sleeve 32 is then screwed into the adapter 92. The member 88 is then slipped over the upper end of the upper sleeve 32' and screwed to the member 86. The sequence from there on is then similar to that described with reference to FIG. 1 for the damper 10. The damper 80 has the advantage that all of the parts can be assembled from the same end to simplify assembly.

What we claim as our invention is:

1. A damper for damping longitudinal shocks in a drill string, said damper comprising:

a sleeve having upper and lower ends and extending longitudinally;

a casing assembly about the sleeve and co-axial with the sleeve, the casing assembly comprising intermediate and upper tubular members connected in axial alignment;

the sleeve and the casing assembly defining respective external and internal splines inter-engaged to permit relative longitudinal movement of the sleeve and the casing assembly and to transmit torsional forces from one of the casing assembly and the sleeve to the other of the casing assembly and the sleeve;

a tubular rubber bush housed loosely in the casing assembly between the upper end of the sleeve and the lower end of the intermediate member so that said longitudinal shocks move the sleeve into the casing assembly thereby deforming the rubber bush to dampen the longitudinal shock;

a tubular rubber sealing bush housed in the intermediate member and a tubular rigid member forming a connection between the first mentioned bush and the sealing bush for transmission of a portion of the longitudinal shock to the sealing bush; and means for limiting the relative longitudinal movement of the tubular rigid member so that the shock absorbed by the sealing bush is limited.

2. A damper as claimed in claim 6 wherein the limiting means comprises a radial flange on the tubular rigid member, the flange being normally axially displaced from the lower end of the intermediate member such that the shock is free to move the rigid member longitudinally upwards until the flange engages the lower end of the intermediate member thereby limiting the shock transmitted to the sealing bush.

* * * * *